(12) United States Patent
Mathe et al.

(10) Patent No.: US 10,399,412 B2
(45) Date of Patent: Sep. 3, 2019

(54) AIR CONDITIONING SYSTEM AND METHOD FOR LEAKAGE DETECTION IN AN AIR CONDITIONING SYSTEM

(71) Applicant: TRUMA GERAETETECHNIK GMBH & CO. KG, Putzbrunn (DE)

(72) Inventors: Christian Mathe, Eching (DE); Georg Hummel, Unterhaching (DE); Sebastian Haertig, Munich (DE); Werner Hiller, Forstinning (DE); Daniel Gumpp, Mering (DE); Mathias Venschott, Munich (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 0 days.

(21) Appl. No.: 15/616,227

(22) Filed: Jun. 7, 2017

(65) Prior Publication Data

US 2017/0355246 A1 Dec. 14, 2017

(30) Foreign Application Priority Data

Jun. 8, 2016 (DE) .......................... 10 2016 110 585

(51) Int. Cl.
*B60H 1/32* (2006.01)
*B60H 1/00* (2006.01)
(Continued)

(52) U.S. Cl.
CPC ..... *B60H 1/00978* (2013.01); *B60H 1/00364* (2013.01); *B60H 1/00885* (2013.01);
(Continued)

(58) Field of Classification Search
CPC ............ F25B 2400/12; F25B 2400/121; F25B 2500/23; F25B 2500/24; F25B 2500/222; F25B 2600/05; F25B 2700/04
See application file for complete search history.

(56) References Cited

U.S. PATENT DOCUMENTS

| 5,241,833 | A | 9/1993 | Ohkoshi |
| 6,708,508 | B2 * | 3/2004 | Demuth ............. B60H 1/00978 62/125 |

(Continued)

FOREIGN PATENT DOCUMENTS

| CN | 102788403 A | 11/2012 |
| CN | 104655365 A | 5/2015 |

(Continued)

OTHER PUBLICATIONS

DE 44 26 339 (English translation).*

*Primary Examiner* — Jonathan Bradford
(74) *Attorney, Agent, or Firm* — McNees Wallace & Nurick LLC

(57) ABSTRACT

There is described an air conditioning system with a refrigerant circuit, wherein the air conditioning system includes a leakage detection system. The leakage detection system has a room temperature sensor, an inlet temperature sensor for detection of a refrigerant temperature at a refrigerant inlet of a refrigerant evaporator, and an outlet temperature sensor for detection of a refrigerant temperature at a refrigerant outlet of the refrigerant evaporator. The sensors (34, 36, 40) are coupled with a calculating unit. In addition, there is described a method for leakage detection, in which a room temperature of the room to be air-conditioned is detected before the refrigerant evaporator on an air inlet side, a refrigerant inlet temperature is detected at the refrigerant inlet of a refrigerant evaporator, and a refrigerant outlet temperature is detected at a refrigerant outlet of the refrigerant evaporator.

11 Claims, 2 Drawing Sheets

(51) Int. Cl.
*F25B 41/04* (2006.01)
*F25B 49/00* (2006.01)

(52) U.S. Cl.
CPC ......... *B60H 1/00985* (2013.01); *F25B 41/04* (2013.01); *F25B 41/043* (2013.01); *F25B 49/005* (2013.01); *B60H 2001/3261* (2013.01); *B60H 2001/3263* (2013.01); *F25B 2400/12* (2013.01); *F25B 2500/19* (2013.01); *F25B 2500/222* (2013.01); *F25B 2700/2104* (2013.01); *F25B 2700/21174* (2013.01); *F25B 2700/21175* (2013.01)

(56) References Cited

U.S. PATENT DOCUMENTS

| | | | |
|---|---|---|---|
| 2002/0124993 A1* | 9/2002 | Nakano | F24F 3/161 165/48.1 |
| 2002/0139128 A1 | 10/2002 | Suzuki et al. | |
| 2004/0250983 A1 | 12/2004 | Arndt et al. | |
| 2005/0086952 A1 | 4/2005 | Nonaka et al. | |
| 2010/0281895 A1* | 11/2010 | Okamoto | F24F 3/065 62/160 |
| 2013/0227977 A1* | 9/2013 | Morimoto | F25B 13/00 62/126 |
| 2016/0109170 A1 | 4/2016 | Schrey et al. | |
| 2016/0146488 A1* | 5/2016 | Ochiai | F25B 13/00 62/125 |

FOREIGN PATENT DOCUMENTS

| | | |
|---|---|---|
| CN | 104677551 A | 6/2015 |
| CN | 105546771 A | 5/2016 |
| CN | 105928156 A | 9/2016 |
| DE | 19850914 A1 | 5/2000 |
| DE | 10318504 B3 | 11/2004 |
| DE | 102008047753 A1 | 3/2010 |
| DE | 102014213267 A1 | 1/2016 |
| EP | 1970651 A1 | 9/2008 |
| JP | S5890138 A | 5/1983 |
| JP | 2008249239 A | 10/2008 |
| KR | 20080027693 | 3/2008 |

* cited by examiner

AIR CONDITIONING SYSTEM AND METHOD FOR LEAKAGE DETECTION IN AN AIR CONDITIONING SYSTEM

The invention relates to an air conditioning system with a refrigerant circuit, wherein as seen in circulation direction of a refrigerant the air conditioning system comprises a refrigerant condenser which can be in heat exchange with an environment, a refrigerant throttle, a refrigerant evaporator which can be in heat exchange with a room to be air-conditioned, and a refrigerant compressor.

Furthermore, the invention relates to a method for leakage detection in an air conditioning system as mentioned above.

BACKGROUND OF THE INVENTION

In the prior art, air conditioning systems are used in a wide variety of fields. In the air conditioning systems refrigerants are used, which have properties adapted to the respective purpose. In conventional air conditioning systems the refrigerants contain fluorinated greenhouse gases, in particular fluorinated hydrocarbons.

With a growing environmental awareness and ever stricter legal requirements, for example of the EU order on fluorinated greenhouse gases, so-called natural refrigerants move into focus more and more. However, these refrigerants in general are combustible, explosive and/or toxic, i.e. in the broadest sense harmful to human health.

Persons in the environment of air conditioning systems using such refrigerants, in particular in the rooms air-conditioned therewith, therefore must be protected from these refrigerants. This is of utmost importance in particular in the case of a refrigerant leakage.

Air conditioning systems with natural refrigerants also are used for air conditioning relatively small rooms. For example, this can be leisure vehicles, i.e. caravans, trailers, mobile homes, temporary housings, accommodation containers, etc. Persons present in such small rooms to be air-conditioned must be protected even from smallest amounts of exiting refrigerant. This requires an effective and robust system for leakage detection, which prevents the exit of refrigerant due to leakage or at least minimizes the exiting amount of refrigerant. This is the only way to provide for a safe operation of an air conditioning system with a natural refrigerant.

It therefore is the object of the invention to provide an air conditioning system in which a refrigerant leakage can be detected in a simple and reliable way. In particular, it should be possible to detect even small refrigerant leakages.

BRIEF DESCRIPTION OF THE INVENTION

The object is solved by an air conditioning system as mentioned above, which includes a leakage detection system, comprising a room temperature sensor which is formed to detect a room temperature of the room to be air-conditioned upstream of the refrigerant evaporator on an air inlet side, an inlet temperature sensor which is formed to detect a refrigerant temperature at a refrigerant inlet of the refrigerant evaporator, an outlet temperature sensor which is formed to detect a refrigerant temperature at a refrigerant outlet of the refrigerant evaporator, and a calculating unit which is coupled with the room temperature sensor, the inlet temperature sensor and the outlet temperature sensor. The calculating unit is formed to calculate an outlet differential temperature as difference of the room temperature and the refrigerant temperature at the refrigerant outlet and an evaporator differential temperature as difference of the refrigerant temperature at the refrigerant inlet and at the refrigerant outlet. The calculation of these two differential temperatures can be effected in a single calculating unit. Alternatively, each of the difference calculations can be effected in a separate calculating unit. In the case of a leakage the refrigerant circuit loses a certain amount of refrigerant. However, for example via a blower the same heat quantity still is introduced from the room to be air-conditioned into the refrigerant evaporator. The same applies for the refrigerant condenser. As a result, the refrigerant temperature at the refrigerant inlet of the refrigerant evaporator decreases and the refrigerant temperature at the refrigerant outlet of the refrigerant evaporator increases. In case of a leakage, the outlet differential temperature hence decreases and the evaporator differential temperature increases. This can be detected by the calculating unit and be recognized as leakage. This does not require either a pressure sensor in the refrigerant circuit or a gas sensor in the room to be air-conditioned. The detection of the leakage thus is easy and reliable. In addition, by means of the temperature sensors a so-called creeping leakage can be detected, i.e. a leakage in which small mass and/or volume flows of refrigerant exit from the air conditioning system over an extended period.

According to one embodiment, a refrigerant-tight separating device is activated upon detection of a leakage, in order to at least partly separate the refrigerant circuit from the room to be air-conditioned.

In a preferred embodiment, the air conditioning system includes a refrigerant-tight separating device for at least partly separating the refrigerant circuit from the room to be air-conditioned. Thus, in case of a leakage the air conditioning system and/or the refrigerant circuit can be separated from the room to be air-conditioned, in which persons can be present. The persons thus are effectively protected from the refrigerant. The separating device preferably can be closed at standstill, i.e. when the air conditioning system is out of operation. This provides for a safe operation of the air conditioning system.

One design variant provides that after detection of a leakage the refrigerant inlet of the refrigerant evaporator is shut off by means of a refrigerant inlet valve and the refrigerant outlet of the refrigerant evaporator is shut off by means of a refrigerant outlet valve.

The refrigerant inlet valve, by means of which the refrigerant inlet can be shut off, and the refrigerant outlet valve, by means of which the refrigerant outlet can be shut off, preferably are formed as solenoid valves. The refrigerant outlet valve alternatively can be a check valve, which is mounted such that it blocks a refrigerant flow in direction of the refrigerant evaporator. The refrigerant evaporator thereby can be separated from the remaining refrigerant circuit. As the refrigerant evaporator in general is disposed in the room to be air-conditioned, shutting off the refrigerant evaporator also separates the room to be air-conditioned from the remaining refrigerant circuit. Thus, persons who are present in this room effectively can be protected from the refrigerant. Due to the valves, shutting off is possible very quickly. In addition, the valves can be designed fail-safe. For example, they can always be closed in a de-energized state. This ensures a safe operation of the air conditioning system.

In addition, after detection of a leakage a refrigerant-tight flap can be closed, which shuts off the air conditioning system from the room to be air-conditioned.

The refrigerant-tight flap can be part of the separating device. The flap preferably can be pretensioned, i.e. springloaded, so that in the case of a leakage it is closed quickly and without an external drive.

Preferably, after detection of a leakage an electronic message is sent, which preferably comprises information on the presence of a leakage.

For sending the message, the leakage detection system can contain a notifying unit which is coupled with the calculating unit. The notifying unit is formed to create a message on the presence of a leakage in the refrigerant circuit. In the simplest case, the notifying unit can be a display, a screen or an indicator lamp, for example an LED. Alternatively, the notifying unit also can create and send an electronic message, for example and SMS or e-mail. Possible recipients beside the operator of the air conditioning system also can be a service provider, a dealer or the manufacturer of the air conditioning system. Thus, persons affected by the leakage can easily be informed about the same.

Advantageously, the refrigerant evaporator is designed as double-tube heat exchanger (see German Patent Application DE 10 2015 122 681). Thus, the refrigerant evaporator which is arranged in the room to be air-conditioned has an increased safety with respect to the exit of refrigerant into the room to be air-conditioned. Consequently, a risk to persons in the room to be air-conditioned in the case of a leakage in the refrigerant circuit is at least reduced.

Another object of the invention is to indicate a method with which a leakage in a refrigerant circuit of an air conditioning system as mentioned above can be detected easily and reliably. In particular, even small leakages should be detected.

The object is solved by a method as mentioned above, which comprises the following steps:
a) detecting a room temperature of the room to be air-conditioned upstream of the refrigerant evaporator on an air inlet side,
b) detecting a refrigerant inlet temperature at a refrigerant inlet of the refrigerant evaporator,
c) detecting a refrigerant outlet temperature at a refrigerant outlet of the refrigerant evaporator,
d) calculating an outlet differential temperature as difference of the room temperature and the refrigerant outlet temperature,
e) calculating an evaporator differential temperature as difference of the refrigerant outlet temperature and the refrigerant inlet temperature,
f) detecting a leakage, when the outlet differential temperature decreases and the evaporator differential temperature increases by a fixed value.

For the outlet differential temperature and/or the evaporator differential temperature limit values can be fixed depending on the application of the air conditioning system. For example, a limit value can refer to a rate of change of a temperature value. Preferably, this limit value is 2 K/min. Alternatively, a limit value can be a temperature value.

Alternatively or in addition to step f) a leakage can be detected when the outlet differential temperature falls below a fixed value, e.g. 10 K, and/or when the evaporator differential temperature exceeds a fixed value, e.g. 15 K.

Upon detection of a leakage the air conditioning system is switched off automatically. Preferably, all control and electrical components of the air conditioning system also are switched off. Preferably, a circuitry-related locking of the air conditioning system takes place in addition, so that the same cannot be switched on again by a user.

BRIEF DESCRIPTION OF THE DRAWINGS

The invention will be explained below with reference to various exemplary embodiments which are shown in the attached drawings, in which.

DETAILED DESCRIPTION OF THE INVENTION

Figure 1:
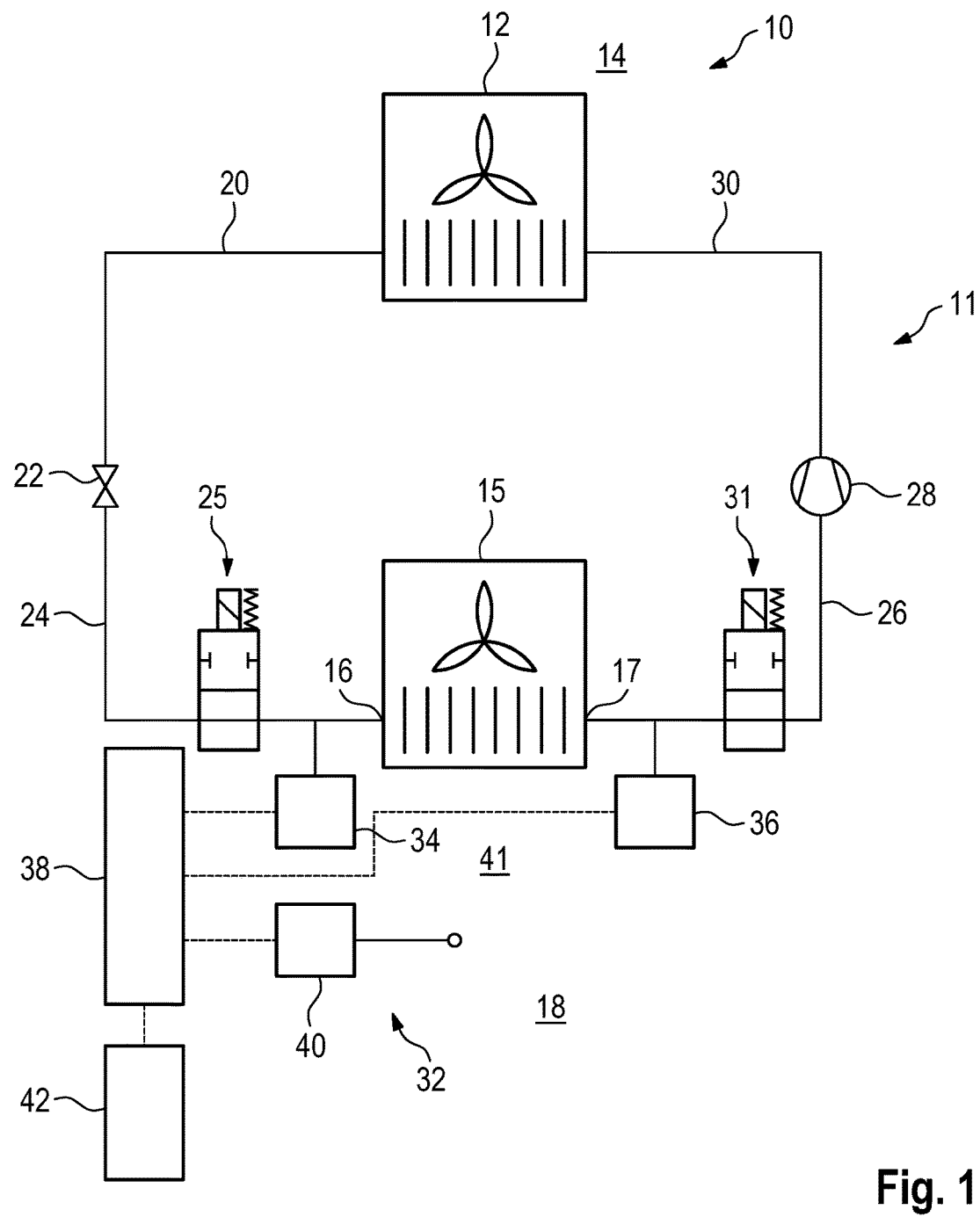
FIG. 1 shows the air conditioning system according to the invention in a schematic overview.

FIG. 1 shows an overview of an air conditioning system 10. The air conditioning system 10 for example can be arranged in a leisure vehicle.

The air conditioning system 10 comprises a refrigerant circuit 11 with a refrigerant condenser 12, which is in heat exchange with an environment 14, and a refrigerant evaporator 15 with a refrigerant inlet 16 and a refrigerant outlet 17, which is in heat exchange with a room 18 to be air-conditioned.

A refrigerant circulates via a refrigerant line 20 from the refrigerant condenser 12 to a refrigerant throttle 22 and from there via a refrigerant line 24 to the refrigerant evaporator 15. The refrigerant line 24 also includes a refrigerant inlet valve 25, by means of which the refrigerant inlet 16 selectively can be separated from the rest of the refrigerant circuit 11.

Proceeding from the refrigerant evaporator 15, the refrigerant circulates via a refrigerant line 26 to a refrigerant compressor 28, which via a refrigerant line 30 is connected with the refrigerant condenser 12. In the refrigerant line 26 a refrigerant outlet valve 31, e.g. a check valve, is disposed, by means of which the refrigerant outlet 17 of the refrigerant evaporator 15 can be separated from the rest of the refrigerant circuit.

For the case that both the refrigerant inlet valve 25 and the refrigerant outlet valve 31 are closed, the refrigerant evaporator 15 is shut off from the remaining refrigerant circuit 11.

The air conditioning system 10 in addition comprises a leakage detection system 32 provided with an inlet temperature sensor 34 which can detect an inlet temperature TE of the refrigerant at the refrigerant inlet 16 of the refrigerant evaporator 15. The leakage detection system 32 in addition comprises an outlet temperature sensor 36 which can detect an outlet temperature TA of the refrigerant at the refrigerant outlet 17 of the refrigerant evaporator 15.

Both the inlet temperature sensor 34 and the outlet temperature sensor 36 are coupled with a calculating unit 38.

The leakage detection system 32 in addition comprises a room temperature sensor 40 which can detect a room temperature TR of the room 18 to be air-conditioned, upstream of the refrigerant evaporator 15 on an air inlet side 41. The room temperature sensor 40 also is coupled with the calculating unit 38.

To the calculating unit 38 a notifying unit 42 is connected in addition.

Alternatively, a combined calculating and notifying unit can be provided.

Figure 2:
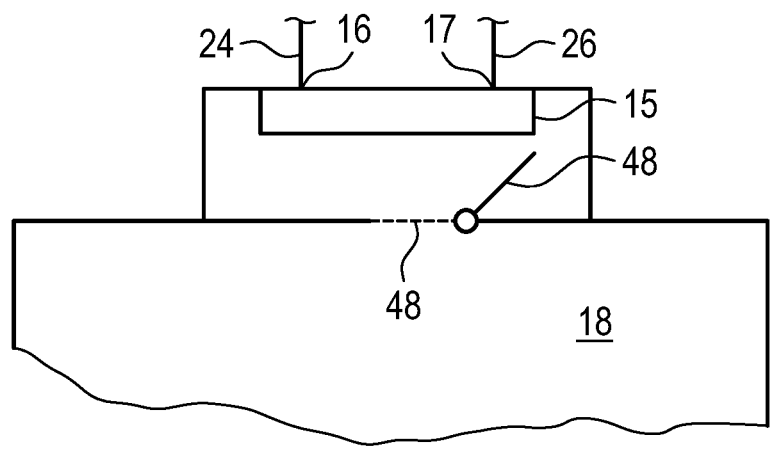
FIG. 2 shows a section of an alternative embodiment of the air conditioning system according to the invention.

An alternative embodiment for shutting off the refrigerant evaporator 15 from the remaining refrigerant circuit 11 is shown in FIG. 2. Here, the refrigerant evaporator 15 is shown schematically and the rest of the refrigerant circuit 11 is cut off. The room 18 to be air-conditioned also merely is shown broken off.

For shutting off the refrigerant circuit 11 and/or the refrigerant evaporator 15 from the room 18 to be air-conditioned a refrigerant-tight flap 48 is provided in the embodiment of FIG. 2, which in its closed position (shown in broken lines) can shut off the air conditioning system 10 from the room 18 to be air-conditioned.

The flap 48 for example can be pretensioned into its closed position.

Alternatively, the flap 48 can be designed as slide.

Figure 3:
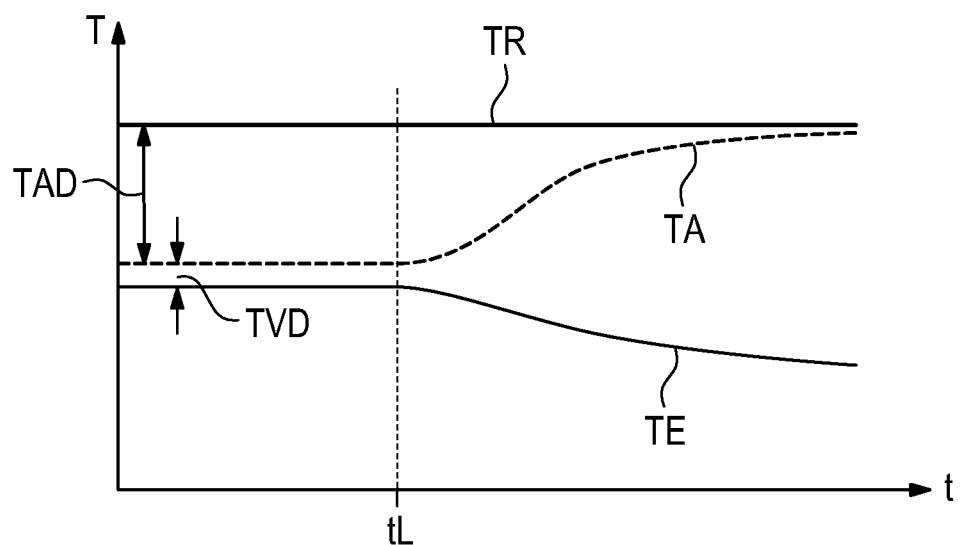
FIG. 3 shows an exemplary course of temperatures in the air conditioning system according to the invention.

The mode of operation of the air conditioning system 10 will now be explained with reference to the diagram shown in FIG. 3. In this diagram, times t are plotted on the x-axis and temperatures T are plotted on the y-axis.

A first curve describes the course of the room temperature TR of the room 18 to be air-conditioned, upstream of the refrigerant evaporator 15 on the air inlet side 41. A second curve represents the course of the refrigerant inlet temperature TE of the refrigerant at the refrigerant inlet 16 of the refrigerant evaporator 15. A third curve illustrates the course of the refrigerant outlet temperature TA at the refrigerant outlet 17 of the refrigerant evaporator 15.

In operation of the air conditioning system 10 the inlet temperature sensor 34 detects the refrigerant inlet temperature TE and communicates the same to the calculating unit 38. The outlet temperature sensor 36 detects the refrigerant outlet temperature TA and forwards the measured temperature value to the calculating unit 38.

In the same way, the room temperature sensor 40 detects the room temperature TR of the room 18 to be air-conditioned, upstream of the refrigerant evaporator 15 on the air inlet side 41 and provides this temperature to the calculating unit 38.

Due to the temperature values provided to the same, the calculating unit 38 calculates an outlet differential temperature TAD as difference of the room temperature TR and the refrigerant outlet temperature TA and an evaporator differential temperature TVD as difference of the refrigerant outlet temperature TA and the refrigerant inlet temperature TE.

For the case that no leakage is present in the air conditioning system 10, the temperatures TR, TA and TE are substantially constant in stationary operation of the air conditioning system 10. Correspondingly, the evaporator differential temperature TVD and the outlet differential temperature TAD also are substantially constant. The refrigerant circulates through the refrigerant circuit 11, the amount of refrigerant remaining substantially constant.

It now is assumed that at the time tL a leakage occurs in the refrigerant line 20. For example, the leakage might be caused by a crack in the refrigerant line 20.

As can be seen in the further course of the description, it is irrelevant at which point of the refrigerant circuit 11 the leakage occurs.

Due to the leakage, a certain amount of refrigerant gets lost from the refrigerant circuit 11.

However, the amount of heat supplied to the refrigerant circuit 11 by the blower at the refrigerant evaporator 15 substantially remains the same. In addition, at the refrigerant condenser 12 a substantially constant amount of heat is withdrawn from the refrigerant via a blower.

The temperature TR of the room 18 to be air-conditioned likewise remains substantially unchanged.

In the following, the inlet temperature TE decreases, as a constant amount of heat is withdrawn from a decreasing amount of refrigerant at the refrigerant condenser 12. The outlet temperature TA increases, as a constant amount of heat is introduced into a reduced amount of refrigerant at the refrigerant evaporator 15.

In the following the outlet differential temperature TAD decreases, and the evaporator differential temperature TVD increases.

In addition, the pressure in the refrigerant circuit 11 decreases.

The calculating unit 38 compares the change of the evaporator differential temperature TVD with a fixed value which is stored in the calculating unit 38. This limit value for example can be 2 K/min.

If the outlet differential temperature TAD now decreases by more than 2 K/min and the evaporator differential temperature TVD increases by more than 2 K/min, the calculating unit 38 detects a leakage.

The limit values for TAD and TVD are to be fixed in dependence on the concrete application and also can be different.

If the outlet differential temperature TAD falls below a fixed value, e.g. 10 K, and/or the evaporator differential temperature TVD exceeds a fixed value, e.g. 15 K, the calculating unit likewise detects a leakage.

As a reaction to the detection of the leakage the calculating unit 38 initially can create a message via the notifying unit 42. For example, the notifying unit can send an SMS or e-mail to a repair service for air conditioning systems.

In addition, the calculating unit 38 will initiate measures for the protection of persons present in the room 18 to be air-conditioned. In the first embodiment, which is shown in FIG. 1, the refrigerant inlet valve 25 and the refrigerant outlet valve 31 will be closed for this purpose. Thus, the refrigerant evaporator 15 is shut off from the remaining refrigerant circuit 11.

Alternatively, the calculating unit 38 in the embodiment shown in FIG. 2 can shift the flap 48 from an open position (continuous line) into a closed position (broken line).

In both alternatives the room 18 to be air-conditioned then is shut off from the air conditioning system 10, in particular from the refrigerant circuit 11. Hence, persons present in the room 18 to be air-conditioned only are exposed to a very small amount of leaked refrigerant or even to no refrigerant at all.

The invention claimed is:

1. An air conditioning system with a refrigerant circuit, wherein in a circulation direction of a refrigerant the air conditioning system comprises a refrigerant condenser which can be in heat exchange with an environment, a refrigerant throttle, a refrigerant evaporator which can be in heat exchange with a room to be air-conditioned, and a refrigerant compressor, characterized in that the air conditioning system includes a leakage detection system with a room temperature sensor which is formed to detect a room temperature of the room to be air-conditioned, upstream of the refrigerant evaporator on an air inlet side, with an inlet temperature sensor which is formed to detect a refrigerant temperature at a refrigerant inlet of the refrigerant evaporator, with an outlet temperature sensor which is formed to detect a refrigerant temperature at a refrigerant outlet of the refrigerant evaporator, with a calculating unit which is coupled with the room temperature sensor, the inlet temperature sensor and the outlet temperature sensor, wherein the calculating unit is formed to calculate an outlet differential temperature as a difference of the room temperature and the refrigerant temperature at the refrigerant outlet and an evaporator differential temperature as a difference of the refrigerant temperature at the refrigerant inlet and at the refrigerant outlet, the outlet differential temperature and the evaporator differential temperature being used for leakage detection.

2. The air conditioning system of claim 1 wherein it includes a refrigerant-tight separating device for at least partly separating the refrigerant circuit from the room to be air-conditioned.

3. The air conditioning system of claim 2 wherein the separating device comprises a refrigerant inlet valve, which is formed to selectively shut off the refrigerant inlet, and a refrigerant outlet valve, which is formed to selectively shut off the refrigerant outlet.

4. The air conditioning system of claim 2 wherein the separating device comprises a refrigerant-tight flap which is formed to shut off the air conditioning system from the room to be air-conditioned.

5. The air conditioning system of claim 1 wherein the leakage detection system comprises a notifying unit, including a display, a screen, or an indicator lamp, which is coupled with the calculating unit.

6. The air conditioning system of claim 1 wherein the refrigerant evaporator is designed as double-tube heat exchanger.

7. A method for leakage detection in an air conditioning system with a refrigerant circuit, wherein in a circulation direction of the refrigerant the air conditioning system comprises a refrigerant condenser which can be in heat exchange with an environment, a refrigerant throttle, a refrigerant evaporator, which can be in heat exchange with a room to be air-conditioned, and a refrigerant compressor, the method comprising the following steps:
   a) detecting a room temperature of the room to be air-conditioned, upstream of the refrigerant evaporator on an air inlet side,
   b) detecting a refrigerant inlet temperature at a refrigerant inlet of the refrigerant evaporator,
   c) detecting a refrigerant outlet temperature at a refrigerant outlet of the refrigerant evaporator,
   d) calculating an outlet differential temperature as a difference of the room temperature and the refrigerant outlet temperature,
   e) calculating an evaporator differential temperature as a difference of the refrigerant outlet temperature and the refrigerant inlet temperature,
   f) detecting a leakage, if the outlet differential temperature decreases and simultaneously the evaporator differential temperature increases by a fixed value.

8. The method according to claim 7, characterized in that after detection of a leakage a refrigerant-tight separating device is activated for at least partly separating the refrigerant circuit from the room to be air-conditioned.

9. The method of claim 8 wherein after detection of a leakage the refrigerant inlet of the refrigerant evaporator is shut off by means of a refrigerant inlet valve and the refrigerant outlet of the refrigerant evaporator is shut off by means of a refrigerant outlet valve.

10. The method of claim 8 wherein after detection of a leakage a refrigerant-tight flap is closed, which shuts off the air conditioning system from the room to be air-conditioned.

11. The method of claim 7 wherein after detection of a leakage an electronic message is sent, which comprises information on the presence of a leakage.

* * * * *